Patented Sept. 7, 1954

2,688,542

UNITED STATES PATENT OFFICE 2,688,542

MATERIAL AND PROCESS FOR THE PRODUCTION OF COLOR PHOTOGRAPHIC IMAGES

Paul D. Dreyfuss, Van Nuys, Calif., assignor, by mesne assignments, to Bela Gaspar, Beverly Hills, Calif.

No Drawing. Application February 9, 1949, Serial No. 75,487

18 Claims. (Cl. 95—6)

This invention relates to the production of dye images from photographic silver images by a process which comprises the synthesis of an azo dye in the exposed photographic emulsion layer.

In the United States Letters Patent 2,071,688 dated February 23, 1937, is described and claimed a method of producing color photographic images in which the photographic layer is subjected to two treatments, the first treatment consisting of the conversion of a dye-forming substance into a dye, and the second treatment consisting of the local dye destruction at the required points. Thus, for example, a diazo compound is transformed into an azo dye by coupling with a phenol; or a phenol or other azo coupler is transformed into an azo dye by treating with a diazo compound, the azo dyes thus formed then being destroyed locally. In the same patent is described and claimed an alternative process in which the first treatment consists of the local destruction of the dye-forming substance; the second treatment then consists of the conversion of the remaining dye-forming substance into the dye. Further alternative processes are described in the U. S. Patents 2,166,049; 2,271,176; 2,333,126; 2,361,541 and 2,368,463, and in the co-pending U. S. patent applications Serial No. 518,256, filed January 14, 1944, now Patent No. 2,514,233, and 541,282, filed June 20, 1944, now abandoned.

In the production of three different azo dyes, e. g., yellow, magenta and cyan, in a photographic three-layer material containing only coupling components or only diazo (or diazo-forming) compounds, it is difficult to find a combination of three diazo (or diazo-forming) compounds which will react with only one azo coupling component to produce three dyes of the required shade, or to find a combination of three azo coupling components which will react with only one diazo compound to produce the three dyes. One way to overcome this difficulty is to dye one part of the three layers (e. g. the top layer) by a different method.

According to the present invention it is possible to produce three azo dyes, for example, a yellow, a magenta and a cyan azo dye, from three coupling components with only one diazo compound. More particularly, my invention relates to the production of blue and cyan dyes under conditions which permit the simultaneous production of magenta and yellow dyes.

The new dye components according to my invention are N-acylaminonaphthols which will produce blue and cyan dyes with certain diazo compounds such as the diazo derivatives of nitrobenzenes, phenylsulfonamides and thiazoles.

Generally speaking, the diazo compounds advantageously used in my process are those which contain non-ionizable electron attracting groups such as $-NO_2$, $-CN$, $-SO_2$-alkyl, $-SO_2$-aryl, $-SO_2-NR_2$ (see e. g., A. E. Remick, "Electronic Interpretations of Organic Chemistry," John Wiley & Sons, 1943, chapters II and V). The diazo compounds may contain one or more of said electron attracting groups and they may contain a further number of weaker electron attracting groups and other substituents such as halogen, hydroxy, carboxylic, Keto, ether and sulfonic acid groups.

Diazo compounds of the indicated class will produce yellow dyes with enolic or phenolic coupling compounds such as acetoacetanilides, salicylic acid derivatives, 2,4-dioxotetrahydroquinolines or pyrazolones. They will produce magenta dyes with such components as m-(N,N-dialkyl)-aminophenol ethers or with aryl or alkyl-naphthylamines or aminonaphtholsulfonic acids. Finally, they will produce cyan dyes with acylaminonaphthols.

I have found the N-acyl derivatives of 1,5-aminonaphthol to be particularly useful coupling components; however, my invention is not limited to the derivatives of this particular compound.

Arylsulfonamidonaphthols containing only a single coupling function and being devoid of hydroxyl groups, sulfonic groups, and leuco dyes in the aryl radical, are already known as coupler compounds in the color development process. However, according to my invention these compounds are not used in photographic processes which include the reaction of the coupling compounds with the oxidation products of developing agents containing primary amino groups.

I have found that the alkylsulfo- or arylsulfo-1-naphthylamines are distinctly different from the 1-naphthylamines themselves. The colors of the azo dyes which are produced by coupling diazo compounds of the above defined class with the above-mentioned alkylsulfo- or arylsulfo-1-naphthylamines absorb at longer wave lengths than the colors obtained from the non-acylated components; e. g., the dye obtained by coupling 2-chloro-4-nitrodiazobenzene with 1-naphthylamine is magenta; however, the dye obtained by coupling 2-chloro-4-nitrodiazobenzene with N-toluene-sulfo-1-naphthylamine is blue. It is noteworthy that the coupling of the acylated components takes place in alkaline solution, whereas the free naphthylamines couple in acid solution. Naphthylamines which are acylated with carboxylic acids do not couple at all.

I have observed a similar shift of the color to longer wavelengths in the dyes produced from acylaminonaphthols as compared with the dyes produced from the aminonaphthols themselves. Whereas for example, the free 1,5-aminonaphthol gives violet dyes with the above-mentioned diazo compounds, the N-acyl-1,5-aminonaphthols give dyes which have, under certain conditions, brilliant blue-green shades. Said certain conditions (choice of diazo compound, pH and solvent) are described further on.

In the case of the acylaminonaphthols the coupling does not depend upon the character of the acyl radical, i. e., N-benzoyl-1,5-aminonaphthol couples with the same ease as N-benzenesulfo-1,5-aminonaphthol. I suppose, therefore, that the coupling takes place in 2- or 4- position to the hydroxyl group. It is remarkable that this coupling takes place very easily; the above-mentioned diazo compounds couple instantaneously in acid solution or in a gelatin emulsion which is buffered to pH 6.5.

Regarding the two series of azo dyes deriving from the 1,5-aminonaphthol, it was heretofore generally assumed that only the aminoazo dyes are desirable because of their deeper and brighter shades as compared with the oxyazo dyes. It has even been stated by previous workers that "the more basic this nitrogen atom (in the 1,5-aminonaphthol), the better the azo dyes." In contrast to this statement, I have found that the N-acyl derivatives of the 1,5-aminonaphthols and of its substituted derivatives couple in acid solution to give oxyazo dyes which have deep and brilliant shades.

The compounds of this invention can be obtained from aminonaphthols (such as 1,5-aminonaphthol, 1-amino-6,8-dichloro-5-naphthol, 1,7-aminonaphthol and 1,5-aminonaphthol sulfonic acids) with acid chlorides or acid anhydrides, preferably in the presence of an acid binding agent such as sodium acetate or pyridine. Many of the N-acylaminonaphthols have sharp melting points and crystallize well from suitable solvents.

The acyl residue linked to the amino group of the aminonaphthol can be any acid radical. I have found that the radicals of carboxylic and sulfonic acids of the aliphatic, aromatic and heterocyclic series are particularly suitable. The acid radical may contain further substituents in order to increase the molecular size or the substantivity of the component, or to influence its solubility. Said further substituents may be reactive groups which permit chemical reactions in the acyl residue after the acylaminonaphthol has been formed.

By way of example, but not in limitation, the following illustrate the types of N-acylaminonaphthols which are suitable according to my invention. (A stands for the aminonaphthol radical.)

1. Caproyl—A
2. Benzoyl—A
3. Crotonyl—A
4. Isoamyloxyacetyl—A
5. p-Aminobenzoyl—A
6. Adipyl-mono—A
7. Adipyl-di—A
8. Phthalyl-mono—A
9. Phthalyl-di—A
10. 3,6,9-trioxaundecane-1,11-bis-(oxyacetyl—A)
11. Phenylene-1,4-di-(oxyacetyl—A)
12. Isoamylsulfo—A
13. 1-propene-1-sulfo—A
14. Naphthalene-beta-sulfo—A
15. Quinoline-5-sulfo—A
16. Diphenylsulfone-3-sulfo—A
17. 2,6-dibromophenol-4-sulfo—A
18. Camphor-beta-sulfo—A
19. 2-furoic acid-5-sulfo—A
20. Isobutyric acid amyl ester alpha sulfo—A
21. Naphthalene-5-sulfonic acid-1-sulfo—A
22. Caproylnaphthionyl—A
23. Ethane-1,2-di-(sulfo—A)
24. Pentane-1,5-di-(sulfo—A)
25. 3,6,9-trioxaundecane-di-(sulfo—A)
26. Naphthalene-1,5-di-(sulfo—A)
27. 2,5-dibromothiophene-3,4-di-(sulfo—A)
28. Phenylene-1,4-di-(oxyethylenesulfo—A
29. 2-phthalimidoethanesulfo—A
30. 2-aminoethanesulfo—A
31. Cyanuryl-tris—A It can be seen from the above list that from polyvalent acids three series of derivatives can be obtained: All of the acid groups may be linked to aminonaphthol radicals (#7, 9 to 11, 23 to 29) or a part of the acid groups may remain free (#6, 8, 19, 21) or a part of the acid group may be linked to non-coupling radicals (#20). From those compounds which contain reactive groups, derivatives may be prepared, e. g., an amino compound (#5 and #30) may be transformed into a symmetrical or unsymmetrical urea, an unsaturated compound (#3) may be co-polymerized with other unsaturated compounds, and a carbonyl compound (#18) may be treated with a reagent which is capable of condensing with a carbonyl group.

*Example 1*

Many variations are possible, e. g., a coupling compound assumed to have the formula

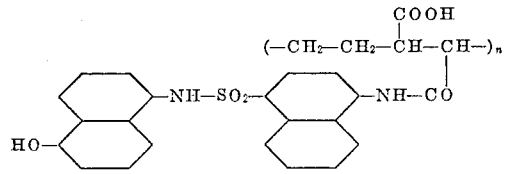

is obtained by melting acetylnaphthionylchloride with 1,5-aminonaphthol in the presence of sodium acetate, splitting off the acetyl group and then refluxing the intermediate in an acetone solution with an ethylene maleic anhydride interpolymer. This compound incorporated in a photographic gelatine layer does not diffuse.

*Example 2*

Another derivative which does not diffuse is obtainable in the following way: 9 grams of anhydroaminobenzylalcohol (prepared by condensation of equimolecular parts of aniline and formaldehyde in hydrochloric acid solution) are heated for 90 minutes with 17 grams of diethyl oxalate to 150–170° C. Thereupon the mass is freed from excess diethyl oxalate by washing with methanol. The residue (which dissolves in boiling sodium hydroxide solution with liberation of alcohol, and which can be precipitated from this solution by addition of hydrochloric acid) is assumed to have one of the following structures:

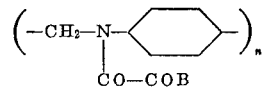

or

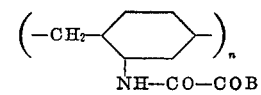

wherein B is the radical $C_2H_5O$. This intermediate is thoroughly mixed with 1,5-aminonaphthol and the mass is heated for 1 hour at 190–200°. The product is washed with hydrochloric acid; the residue is dissolved in pyridine and precipitated with alcohol. The properties of the product, having probably one of the above structures ($B=C_{10}H_6(OH)$—NH—), can be varied within wide limits; e. g., if an excess of 1,5-aminonaphthol is used, the product becomes difficultly soluble in the common solvents. However, if only 1 mol of 1,5-aminonaphthol is used for every two oxalic units of the above intermediate, a product is obtained which after mild treatment with aqueous sodium hydroxide becomes soluble in sodium bicarbonate. Furthermore, the solubility can be adjusted by varying the molecular size of the above intermediate. If the anhydroaminobenzylalcohol is replaced by a condensation product of 1 mol of aniline with more than 0.5 but less than 1 mol of formaldehyde, the final product becomes more soluble. Even these more soluble products are fast to diffusion. The anhydroaminobenzylalcohol can be replaced by other primary and secondary polyamines, and the oxalic ester can be replaced by such compounds as phthalic anhydride, succinic anhydride, ethyl sebacate, etc.

*Example 3*

If 2-chloro-5-nitrobenzenesulfomethylanilide-4'-sulfochloride is treated with 1,5-aminonaphthol, an intermediate is obtained which by further reaction with ammonia is transformed into a compound having the formula:

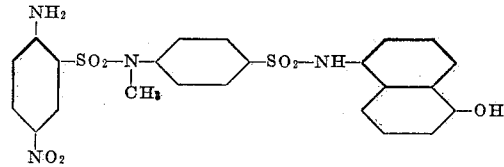

This compound, incorporated into a light sensitive layer, can be transformed into a dye according to the process described in Gaspar, U. S. Patent 2,368,463.

Those compounds containing solubilizing groups in the aminonaphthol nucleus or in the acid radical can be incorporated into the light sensitive emulsions from aqueous solutions. Thereupon they may be transformed into insoluble salts, e. g., according to U. S. Patents 2,317,184 or 2,319,984.

Those compounds which contain carbonyl groups (#18) may be transformed into soluble compounds (e. g., they may be treated with bisulfite or with p-sulfophenylhydrazine) and incorporated into the emulsion by the method described in Gaspar, U. S. Patent 2,221,792.

Other components, neither containing solubilizing groups nor permitting the introduction of such groups, are dissolved in organic solvents or (with exclusion of air) as naphtholates in water.

Components which are dispersed in gelatin emulsions with particular ease are those containing hydrotropic substituents in the acid radical; e. g., the components obtained by melting p-aminobenzoyl-1,5-aminonaphthol with an excess of mucic acid ethyl ester forms stable gelatin solutions. Further methods to obtain homogeneous dispersion of water insoluble dye-forming substances, which are adaptable to acylaminonaphthols, are disclosed in U. S. Patents 2,258,755 and 2,310,226.

The incorporation of the components into the photographic emulsion can be facilitated furthermore by mixing the gelatin with other organic compounds such as cellulose glycollic acid, cellulose propionic acid, polyethyleneglycols and other high molecular compounds which are compatible with gelatin, or by using other binding agents such as acrylic and vinyl resins. The addition of the high molecular weight compounds to the gelatin emulsion has advantages other than those mentioned above, as will be seen in the following.

Azo dyes, obtained by coupling nitrodiazo compounds with azo coupling components, are not pH stable. They are brilliant dyes only at high pH values, whereas they are dull or light colored in acid media. The photographic image, therefore, after complete processing, must be buffered to a pH at which the dyes have the desired color. The pH at which the color changes depends not only upon the azo components, but upon the diazo components as well. If suitable diazo components were used in the coupling a final wash in tap water may be sufficient to make the colors appear. With other diazo components or other coupling components, the processed photographic material may have to be treated in buffering solutions such as aqueous solutions of sodium acetate, bicarbonate, carbonate, borate, phosphate or triethanolamine. However, the color of a given dye depends not only on the pH of the substrate but upon other factors as well; e. g., the color is more brilliant in dry gelatin than in wet gelatin, more brilliant in a formaldehyde hardened gelatin than in an unhardened gelatin. Finally, the pH at which the color of the dye changes is shifted to a lower pH if the gelatin contains solvents such as alcohols, ketones, ethers, esters, ureas, amines, etc.; that is, the photographic images are stable within a wider pH range if the emulsions contain, besides gelatin, other organic non-volatile compounds of the above indicated classes. Such non-volatile compounds can be added to the emulsion before coating or they can be incorporated later on. Suitable compounds are, for example, polyethylene glycols, partially esterified or etherified cellulose, sodium dodecylsulfonate, dibutylketone and cholesterin. Finally, substances such as polyethyleneimines, anhydroaminobenzylalcohol, formaldehyde urea resins and quaternary amine bases can be used which act simultaneously as solvents and buffers. A finished multicolor image which is off balance can be balanced at will by adjusting the pH and the quantity of organic solvent added to the last processing bath; and in a multicolor master image from which color separations are printed, one or more colors can be reversibly suppressed for the time of printing one color separation by changing the pH.

The photographic material, containing in one layer an acylaminonaphthol and a silver halide emulsion, is treated with a diazo compound at any point after the exposure. The diazo compound can be dissolved in a photographic bath, or a diazo-forming compound can be incorporated in the layer. If the diazo compound is dissolved in a photographic bath, said bath can be buffered so that no coupling takes place, and the coupling is then performed in a separate coupling bath. Instead of the diazo compound, diazo formers such as amines, antidiazotates, diazoamines, etc., can be used. The destruction of the diazo forming substance, of the diazo compound or of the dye can be performed in an acid bath, e. g., such as are described in U. S. Patent 2,020,775 or in an alkaline bath, e. g., in an alkali stannite bath. It is furthermore possible to bind the diazo compound in some parts of the image; e. g., as silver antidiazotate, and to wash the diazo compound out from those parts where no silver antidiazotate has formed.

The azo coupling components are incorporated in the sensitive photographic material or they can be absorbed by said material from photographic processing baths. If they are incorporated in the sensitive material they can be homogeneously divided within one or more of the sensitive layers or within adjacent layers or within organic resins which are dispersed in the photographic colloid.

Light sensitive photographic emulsions containing acylaminonaphthols can be sensitized to any desired color. The presence of the acylaminonaphthols in the emulsion has no adverse effect on the sensitivity of said emulsion. The emulsion containing the components may be coated as a single layer on the support or as superimposed layers on one or both sides of the support. The superimposed layers may be differentially sensitized. The support may be a transparent medium such as glass, or a cellulose ester, or an opaque medium such as paper or an opaque cellulose ester.

*Example 4*

To 100 ml. of a high speed negative emulsion, sensitized to red light and having pH=7, are added 0.9 ml. of a 2 n acetic acid solution. A solution of 0.7 gram of naphthalene-1,5-di-(sulfonaphthionyl-1′,5′-aminonaphthol) in a mixture of 0.9 ml. ethyl alcohol and 0.9 ml. of 2 n aqueous sodium hydroxide is added to the emulsion. This emulsion is perfectly stable; it maintains its original sensitivity, and the component does not separate out, even after being kept at 40° C. for a period of three hours. The emulsion is coated on a transparent film base. On top of this emulsion layer is coated a clear gelatin interlayer and then a high-speed green sensitive emulsion containing the n-amyl ether of m-(N,N-diethylamino)-phenol. Thereupon follows a gelatin layer containing a yellow filter dye, and finally the top layer consisting of a blue sensitive emulsion containing N,N′-decamethylene-bis-(2,4-dioxo-1,2,3,4-tetrahydroquinoline).

The material is exposed and developed. Then it is treated for 7 minutes in a bath containing 1% acetic acid and 0.1% 4-nitro-1-diazonaphthalene-6-sulfonic acid. Thereupon it is treated in a dye destruction bath which bleaches the dyes locally at the points where metallic silver is present. Suitable baths are disclosed in U. S. Patent 2,020,775 and subsequent patents such as Re. 22,308 and 2,410,025. After the silver is removed in known manner the material is immersed for a short time in an aqueous solution containing 0.4% ethanolamine and 3% "polyethylene glycol 300" (Carbide & Carbon Corp.). After drying, a photograph in natural colors is obtained. The ethanolamine in the last bath can be replaced by other alkalis; if a high molecular polyethylene glycol ("Carbowax") was added to the gelatin emulsions before coating, the polyethylene glycol in the last bath can be omitted. The final image can be coated with a lacquer layer in order to protect the image from acid vapors. However, even without such protective coating the presence of a sufficient amount of buffering agent makes the image stable for all practical purposes and, should an image deteriorate from acid vapors, it can be restored easily in an ammonia atmosphere or by treatment with a solution of a pH higher than 6.

The 1-diazo-4-nitro-6-sulfonaphthalene used in the foregoing example can be replaced by such compounds as:

2-nitrodiazobenzene
2,4-dinitrodiazobenzene
5-nitro-2-diazobenzotrifluoride
2,6-dichloro-4-nitrodiazobenzene
5-fluoro-6-bromo-2,4-dinitrodiazobenzene
6-bromo-2,4-dinitrodiazobenzene
5-nitro-2-diazophenol
5-nitro-2-diazobenzonitrile
5-nitro-2-diazobenzoic acid, its esters and amides
5-nitro-2-diazophenylmethylketone
2,5-dinitro-4-diazophenoxyacetic acid
5-nitro-2-diazo-4′-sulfodiphenyl ether
5-nitro-2-diazodiphenylsulfone
3,5-dinitro-2-diazophenylethylsulfone
N-(3-nitro-4-diazobenzenesulfo)-carbazole
N-(5-nitro-2-diazobenzenesulfo)-n-propylamine
N-(5-nitro-2-diazobenzenesulfo)-ethanolamine
N-(5-nitro-2-diazobenzenesulfo)-methylaniline-4′-sulfonic acid
N - (5 - nitro - 2 - diazobenzenesulfo) - p - aminobenzoic acid
N - (4 - nitro - 1 - diazonaphthalene - 7 - sulfo)-ethylaniline
N - (4 - nitro - 1 - diazonaphthalene - 2 - sulfo)-diethanolamine
4-nitro-1-diazonaphthalene-2,7-disulfonic acid
1-diazo-2,4,6-trisulfonamidobenzene
1 - diazo - 2,4,6 - tri(N - morpholinyl) sulfonamidobenzene
1 - diazo - 2,4,6 - tri(N,N - diethyl) sulfonamidobenzene
1-diazo-2,4-di(N,N-diethyl) sulfonamidobenzene
6-nitro-2-diazobenzothiazole
4-methyl-2-diazothiazole These diazo compounds can be used in acid processing baths, in a manner described in Example 4. Different results are obtained in the dye couplings depending upon the acidity of the bath, as the diazo compounds are decomposed by metallic silver in strongly acid solution.

*Example 5*

The material, coated, exposed and developed as described in the foregoing Example 4, is immersed for 5 minutes in a bath containing 0.1% 4-nitro-1-diazonaphthalene-6-sulfonic acid and 4% hydrochloric acid. Thereupon it is carried without rinsing into an acetic acid-sodium acetate bath having the pH 6.5. The coupling takes place only at the places where no metallic silver is present, and no dye destruction bath is necessary. After the silver is removed and the material is buffered in the same manner as described above, a positive image in natural colors is obtained. The same effect is achieved in a weakly acid diazo bath which contains 0.002% 2,3-diaminophenazine.

As the diazo bath tends to attack the metallic silver image slightly even in acetic acid solution, but is not influenced in an acid bath by the presence of silver halogenide, ferrocyanide or other silver salts, it is possible to avoid this attack in the following way:

*Example 6*

The material, coated, exposed and developed as described in Example 4, is treated in a hypo bath. Thereupon the superimposed silver images are converted into silver salt images, e. g., in a copper chloride bath into silver chloride. The material is treated in a diazo bath as is described in Example 4, and the silver salt images are redeveloped to form metallic silver images. The dye bleaching and the further processing are performed in the same manner as in Example 4.

The copper chloride bath used in Example 6 may be replaced by a potassium ferricyanide bath. The conversion of the metallic silver image into such other image which is inert to a diazonium salt but which can be converted further into a dye image is preferable whenever the image is brought into contact with free diazonium compounds at pH<7 and a diffuse coupling is desired. The method of temporary inactivation of the image (e. g., rehalogenation of the metallic silver image) is equally suitable in the processing of photographic materials which are immersed in diazo baths and in the processing of photographic materials containing diazo forming substances incorporated within the layers.

Still further variations are possible in the processing of the material. It has been found that many diazo compounds, particularly those containing free sulfonic acid groups, penetrate the gelatin layers much more easily in alkaline than in acid solution. Therefore, many diazo compounds can be absorbed into the material from alkaline baths. The syndiazotates, the antidiazoates and the diazoamino compounds are particularly useful for this procedure. The neutral and alkaline solutions of the antidiazotates and diazoamino compounds are valuable in the processing of the photographic materials not only for their penetrative capacity but also for their stability. For example, the diazo bath described in Example 4 must be kept at low temperature and cannot be conserved for a long period, whereas the antidiazotate bath of the following Example 7 is very stable and can easily be replenished if used in a continuous process. The antidiazotates and other stabilized diazo compounds, absorbed into the photographic material from alkaline solutions, are converted into reactive diazo compounds in successive baths. This conversion into reactive diazo compounds and the coupling with the coupling components can be performed in one step, or in separate steps.

It is even possible to perform the splitting and the coupling directly in the baths which contain the above-mentioned stabilized diazo derivatives; e. g., if a photographic material is buffered in an acid bath, washed and immersed in a neutral antidiazotate bath, the antidiazotate penetrates and couples instantaneously. Even without previous treatment of the material in an acid bath, the otherwise stable diazo derivative is activated while it penetrates into said material; for example in the case of neutral antidiazotate solutions, where an equilibrium between the syn- and antidiazoate modifications exists, the syndiazotate will couple with the azo components present in the layers, the equilibrium therefore is disturbed and, by continuous generation of syndiazotate from the antidiazotate, a quantitative coupling takes place.

Besides the stability and penetrative capacity of alkaline or neutral baths containing syndiazotates, antidiazotates or diazoamino compounds, the particular advantage of said baths is that they do not attack the metallic silver images, and that the diazo compounds can be activated and coupled under sufficiently mild conditions to reduce the interference of the metallic silver with the diazonium salt to a minimum.

*Example 7*

The material, coated, exposed and developed as described in Example 4, is immersed for 3 minutes in a bath containing 0.2% potassium 4-nitro-6-sulfo naphthalene antidiazotate and 0.5% sodium carbonate. The still colorless material is hung for thirty minutes in the air, or for five minutes in a carbon dioxide atmosphere, whereby complete coupling takes place. Thereupon the material is treated in a dye destruction bath and in the further processing baths, described in Example 4. The potassium 4-nitro-6-sulfonaphthalene-antidiazoate is prepared by diazotizing 4 - nitro - 1 - naphthylamine - 6 - sulfonic acid or by nitrating 1-diazo-6-sulfonaphthalene, and by dissolving the isolated diazo compound in potassium hydroxide. After some time crystals begin to appear, and the yield can be increased by addition of potassium chloride to the solution. The aqueous solution of these crystals does not couple with azo couplers; however, it couples with azo couplers under the influence of the carbon dioxide in the air, or in the presence of other weak acids.

The diazoamino compounds derived from diazo compounds devoid of solubilizing groups must contain solubilizing groups in the stabilizing component; e. g., 2-ethylamino-5-sulfobenzoic acid or methyltaurine can be used to stabilize non-solubilized diazo compounds. The solubilized diazo compounds can be stabilized with solubilized stabilizers or with stabilizers which are devoid of solubilizing groups, such as piperazine or diethylamine. In most cases the active diazonium salts form less easily from diazoamino compounds than they do from antidiazotates; whereas the antidiazotates are capable of coupling in neutral or weakly acid medium, most diazoamino compounds must be split in a strong acid and coupled afterwards in a buffered solution. As the splitting of the diazoamino compounds in strong acid produces free diazonium salts, which under these conditions react with the metallic silver, this method can be used in processes along the line of Examples 5 and 6, i. e., where a dye image is produced directly from a silver image without a separate dye destruction bath, or where the silver deposit is converted into such other deposit which will not react with the diazonium salt.

In order to produce a diffusely dyed layer from an azo coupler component and a diazoamino compound in the presence of a metallic silver image, it is necessary to split the diazoamino compound under mild conditions. This can be done by suitable selection of the stabilizer or by the addition of a compound which favors the splitting of the diazoamino compound without lowering the pH. How the stability of the diazoamino compound can be adjusted by the choice of a suitable stabilizer component can be seen from a comparison between some of the diazoamino compounds derived from 2-nitro-4-sulfodiazobenzene. If this diazo compound is stabilized with 1,2,3,4-tetrahydrocarbazol-6-sulfonic acid, a diazoamino compound is obtained which splits even in a very weakly acid solution. Therefore, a bath containing this diazoamino compound can be used in the same manner as is described in Example 7 for an antidiazotate bath. However, if the 2-nitro-4-sulfodiazobenzene is stabilized with N-methylaniline, a lower pH is required to perform the splitting; the activation takes place slowly in an acetic acid bath and instantaneously in a hydrochloric acid bath. The diazoamino compound produced from 2-nitro-4-sulfodiazobenzene and piperidine splits in hydrochloric acid, but no appreciable splitting takes place in acetic acid. Therefore, the piperidine compound can be absorbed into the layer in a procedure similar to that described in Example 7, but the further processing must be done by following the directions of Example 5.

Diazoamino compounds which split difficultly as, e. g., the above mentioned piperidine compound can be activated by still other means than by lowering the pH. As can be seen from the scheme:

I. Diazoamino compound⇌diazo component+ stabilizer component.
II. Diazo component + coupling component→azo dye.

the activation is a reversible process, whereas the azo dye-coupling is an irreversible process. It was found that it is possible to favor the right side of the equilibrium, I, without harming the reaction, II, of the above scheme. This can be done, either by adding a compound which reacts with the stabilizer component in order to remove it from the equilibrium, or by adding a compound which will react with the diazoamino compound to produce a reaction product which splits more easily than does the original diazoamino compound. Compounds which favor the right side of the equilibrium, I, in the above scheme at a given pH and a given temperature, shall be called "splitting catalysts" in the appended claims. For example, many diazoamino compounds split at a higher pH in the presence of sodium nitrite than they do otherwise, and the above-mentioned piperidine compound, which requires a strong acid for activation, splits in acetic acid in the presence of formaldehyde. It is therefore possible to absorb the diazoamino compound, obtained from 2-nitro-4-sulfodiazobenzene and piperidine (and isolated as the barium salt), from a neutral solution into a photographic material which was coated, exposed and developed as described in Example 4, and to couple all three layers in a bath containing acetic acid and formaldehyde. The liberated diazonium salt couples instantaneously with the three coupling components to produce three diffusely colored layers, and thereupon the azo dyes are bleached in the manner described in Example 4.

A further method to facilitate, at the same time, the activation of the diazo compound and the formation of the azo dye, consists of treating the photographic material at elevated temperature. It is obvious that this procedure is limited by the consistency of the support and binding agents which make up the photographic material. The treatment at elevated temperature can take place outside of a processing bath, e. g., a photographic material made up of superimposed silver images imbedded in hardened gelatin layers and containing diffusely therein azo coupling components, is immersed in a bath containing a diazo compound and thereafter hung in a chamber through which an air current heated to 45° C. is blowing. Said air current may contain water vapors and buffer substances such as ammonia or sprays of such substances.

Since, from the foregoing description of the new photographic material and the method to process the same it will be apparent to those skilled in the art that many variations of this invention may be made without departing from the spirit and scope thereof, it is to be understood that I do not limit myself to the specific examples thereof except as defined in the appended claims.

I claim:

1. In a process of producing a photographic dye image from a photographic material having at least one layer containing a metallic silver image and an N-acylated 1,5 amino naphthol as an azo coupling compound in which the acyl radical is an organic acyl radical the step which comprises treating said layer in a bath containing a strong acid and a diazonium salt which carries at least one non-ionizable electron attracting group in at least one of the ortho and para positions to the diazo group, whereby a portion of the diazonium salt is decomposed locally in the presence of the metallic silver image and coupling a portion of the diazonium salt locally with said azo coupling compound.

2. In a process of producing a photographic dye image from a photographic material having at least one layer containing a metallic silver image and an N-acylated 1,5 amino naphthol as an azo coupling compound in which the acyl radical is an organic acyl radical the step which comprises treating said layer in a neutral to weakly acidic bath containing a diazonium salt which carries at least one non-ionizable electron attracting group in at least one of the ortho and para positions to the diazo group to convert said azo coupling compound into an azo dye in essentially diffuse dispersion.

3. In a process of producing a photographic dye image from a photographic material having at least one layer containing a metallic silver image and an N-acylated 1,5 amino naphthol as an azo coupling compound in which the acyl radical is an organic acyl radical the steps which comprise converting the metallic silver image into a silver salt image, coupling a diazo compound with said azo coupling compound to form a diffusely dispersed azo dye in the presence of said silver salt image, said diazo compound carrying at least one non-ionizable electron attracting group in at least one of the ortho and para positions to the diazo group, converting said silver salt image into a metallic silver image and destroying said azo dye in said layer in proportion to the metallic silver image in said layer.

4. In a process of producing a photographic dye image from a photographic material having at least one layer containing an N-acylated 1,5 amino naphthol as an azo coupling compound in which the acyl radical is an organic acyl radical, a metallic silver image, and a stabilized diazo compound the steps which comprise transforming said stabilized diazo compound into a reactive diazo compound within said layer, said reactive diazo compound carrying at least one non-ionizable electron attracting group in at least one of the ortho and para positions to the diazo group, and coupling the reactive diazo compound with said azo coupling compound.

5. In a process as claimed in claim 4, in which the pH of said layer is lowered to transform the stabilized diazo compound into a reactive diazo compound.

6. In a process as claimed in claim 4, in which the transformation of the stabilized diazo compound into a reactive diazo compound is carried out in the presence of a splitting catalyst for said stabilized diazo compound.

7. In a process of producing a photographic dye image from a photographic material having at least one layer containing an N-acylated 1,5 amino naphthol as an azo coupling compound in which the acyl radical is an organic acyl radical, and a metallic silver image, the step which comprises immersing such material in a bath containing a small amount of a reactive diazo compound in equilibrium with a stabilized diazo compound, said reactive diazo compound carrying at least one non-ionizable electron attracting group in at least one of the ortho and para positions to the diazo group, whereby the small amount of the reactive diazo compound couples with said azo coupling compound thereby disturbing said equilibrium to cause formation of more of said reactive diazo compound and effecting complete coupling without lowering the pH.

8. A photographic emulsion for producing azo dye images comprising a carrier containing a light sensitive silver halide and an N-acylated 1,5 amino naphthol as an azo coupling compound in which the acyl radical is an organic acyl radical.

9. A photographic material comprising a layer formed of a binding agent containing a light sensitive silver halide, an N-acylated 1,5 amino naphthol as an azo coupling compound in which the acyl group is an organic acyl group and a non-volatile solvent for said compound diffusely dispersed in said binding agent.

10. A photographic material for producing azo dye images composed of differently sensitized silver halide emulsions, at least one of said emulsions containing an N-acylated 1,5 amino naphthol as an azo coupling compound in which said acyl group is an organic acyl group and the other emulsions containing other azo coupling compounds, said coupling compound being capable of reacting with a diazo compound which carries at least one non-ionizable electron attracting group in at least one of the ortho and para positions to the diazo group, to form a photographic dye image.

11. A photographic material for producing azo dye images composed of differently sensitized silver halide emulsions, at least one of said emulsions containing an N-acylated 1,5 amino naphthol as an azo coupling compound in which said acyl group is an organic acyl group and the other emulsions containing other azo coupling compounds, all of said coupling compounds being capable of producing different colors when treated with the same diazo compound, said diazo compound carrying at least one non-ionizable electron attracting group in at least one of the ortho and para positions to the diazo group.

12. In a process of producing a photographic dye image from a photographic material having at least one layer containing a metallic silver image and an N-acylated 1,5 amino naphthol as an azo coupling compound in which the acyl radical is an organic acyl radical the step which comprises treating said layer in a bath containing a strong acid and a diazonium salt which carries at least one non-ionizable electron attracting group in at least one of the ortho and para positions to the diazo group, whereby a portion of the diazonium salt is decomposed locally in the presence of the metallic silver image, coupling a portion of the diazonium salt locally with said azo coupling compound to provide an azo dye image and adjusting the pH of said layer to produce the desired shade and intensity of said azo dye image.

13. In a process of producing a colored photographic image in a photographic emulsion layer containing a light sensitive silver halide, the steps which comprise exposing said layer to light and thereafter coupling within said layer an azo coupling compound selected from the group consisting of N-acyl 1,5 amino naphthols and N-acyl 1,7 amino naphthols in which the acyl radical is an organic acyl radical with a diazo compound which carries at least one non-ionizable electron attracting group in at least one of the ortho and para positions to the diazo group.

14. In a process of producing a colored photographic image the steps which comprise exposing to light a photographic emulsion layer containing a light sensitive silver halide and an N-acylated 1,5 amino naphthol as an azo coupling compound in which the acyl radical is an organic acyl radical, and thereafter treating said layer in a bath containing a diazo compound which carries at least one non-ionizable electron attracting group in at least one of the ortho and para positions to the diazo group.

15. In a process of producing a colored photographic image the steps which comprise exposing to light a photographic emulsion layer containing a light sensitive silver halide and an N-acylated 1,5 amino naphthol as an azo coupling compound in which the acyl radical is an organic acyl radical, and thereafter treating said layer in a bath containing a diazo compound which carries at least one nitro group in at least one of the ortho and para positions to the diazo group.

16. In a process of producing a colored photographic image in a photographic emulsion layer containing a light sensitive silver halide, the steps which comprise exposing said layer to light, developing a silver image in said layer, fixing said layer to remove residual silver halide and coupling within said layer an azo coupling compound selected from the group consisting of N-acyl, 1,5 amino naphthols and N-acyl 1,7 amino naphthols in which the acyl radical is an organic acyl radical with a diazo compound which carries at least one non-ionizable electron attracting group in at least one of the ortho and para positions to the diazo group, at a point in the process after exposure to light.

17. In a process as defined in claim 7, wherein said stabilized diazo compound is an antidiazotate and said reactive diazo compound is a syndiazotate.

18. In a process as defined in claim 7, wherein said stabilized diazo compound is a diazoamino compound and said reactive diazo compound is a diazonium salt.

References Cited in the file of this patent

UNITED STATES PATENTS

| Number | Name | Date |
|---|---|---|
| 2,071,688 | Gaspar | Feb. 23, 1937 |
| 2,138,602 | Hill | Nov. 29, 1938 |
| 2,265,559 | Watkins | Dec. 9, 1941 |
| 2,271,176 | Gaspar | Jan. 27, 1942 |
| 2,322,001 | Ehrenfried | June 15, 1943 |
| 2,326,055 | Morris | Aug. 3, 1943 |
| 2,333,126 | Schwarc | Nov. 2, 1943 |
| 2,361,541 | Gaspar | Oct. 31, 1944 |
| 2,420,631 | Taylor | May 13, 1947 |
| 2,514,233 | Gaspar | July 4, 1950 |
| 2,551,570 | Von Glahn et al. | May 1, 1951 |
| 2,564,238 | Sprung | Aug. 14, 1951 |